(12) United States Patent
Yashiki et al.

(10) Patent No.: US 8,409,485 B2
(45) Date of Patent: Apr. 2, 2013

(54) METHOD FOR MANUFACTURING A TUBULAR BODY

(75) Inventors: Yuichi Yashiki, Kanagawa (JP); Kyoko Nishikawa, Kanagawa (JP); Shigeo Ohta, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 570 days.

(21) Appl. No.: 12/620,959

(22) Filed: Nov. 18, 2009

(65) Prior Publication Data
US 2010/0316804 A1 Dec. 16, 2010

(30) Foreign Application Priority Data
Jun. 16, 2009 (JP) .................... 2009-143739

(51) Int. Cl.
| B28B 7/14 | (2006.01) |
| B28B 1/02 | (2006.01) |
| B29D 7/00 | (2006.01) |
| B05D 3/00 | (2006.01) |
| B32B 37/00 | (2006.01) |

(52) U.S. Cl. ... 264/163; 264/161; 264/162; 264/172.19; 264/213; 264/214; 264/216; 264/310; 264/312; 427/272; 427/282; 427/284; 427/300; 156/289

(58) Field of Classification Search .................. None
See application file for complete search history.

(56) References Cited

U.S. PATENT DOCUMENTS 5,338,627 A * 8/1994 Shigeta ............... 430/6
5,654,055 A * 8/1997 Cox et al. .................... 428/41.7
6,139,784 A 10/2000 Oshima et al.

FOREIGN PATENT DOCUMENTS

| JP | A-5-77252 | 3/1993 |
| JP | A-10-63115 | 3/1998 |
| JP | A-2002-86465 | 3/2002 |
| JP | 2004-109665 | * 4/2004 |
| JP | A-2004-287383 | 10/2004 |
| JP | A-2005-66838 | 3/2005 |
| JP | A-2006-218844 | 8/2006 |
| JP | A-2007-296838 | 11/2007 |
| JP | A-2008-20627 | 1/2008 |
| JP | A-2008-185661 | 8/2008 |

* cited by examiner

*Primary Examiner* — Jeffrey Wollschlager
(74) *Attorney, Agent, or Firm* — Oliff & Berridge, PLC

(57) ABSTRACT

A method for manufacturing a tubular body, includes: attaching a first member to an outer or inner peripheral surface of one end in an axial direction of a cylindrical core, along a circumferential direction of the peripheral surface thereof; applying a first resin solution on the peripheral surface, to cover it and the peripheral surface of one end of the first member closer to the center of the core, and to form a coating (first coat film); attaching a second member to the peripheral surface of the end of the first coat film on the side where the first member has been attached; applying a second resin solution on the peripheral surface of the first coat film, to cover it and the peripheral surface of the end of the second member closer to the center, and to form a coating (second coat film); peeling off the first and second members.

8 Claims, 11 Drawing Sheets

METHOD FOR MANUFACTURING A TUBULAR BODY

CROSS-REFERENCE TO RELATED APPLICATION

This application claims priority under 35 USC 119 from Japanese Patent Application No. 2009-143739 filed on Jun. 16, 2009.

BACKGROUND

1. Technical Field

The present invention relates to a method for manufacturing a tubular body.

2. Related Art

There are certain endless belts known as tubular bodies, and they include, for example, an endless belt (tubular body) containing a polyimide resin or a polyamideimide resin as a constituent material, and containing electroconductive particles dispersed in the resin; and an endless belt (tubular body) having a layered structure in which resin coat films having different surface resistivities are arranged in layers.

SUMMARY

According to an aspect of the invention, there is provided a method for manufacturing a tubular body, including:

attaching a first band-shaped member to an outer peripheral surface or an inner peripheral surface of at least one end in an axial direction of a cylindrical core, along a circumferential direction of the outer peripheral surface or the inner peripheral surface;

applying a first film forming resin solution on the outer peripheral surface or the inner peripheral surface of the core, to cover the outer peripheral surface or the inner peripheral surface of the core, and the outer peripheral surface or the inner peripheral surface of at least one end in the width direction of the first band-shaped member that is closer to the center of the core, and to form a coating of the first film forming resin solution;

drying the coating of the first film forming resin solution to form a first coat film;

attaching a second band-shaped member to the outer peripheral surface or inner peripheral surface of the end of the first coat film on the side where the first band-shaped member has been attached, such that the end in the width direction of the second-shaped member that is closer to the center of the core, is closer to the center of the core than the end in the width direction of the first band-shaped member that is closer to the center of the core;

applying a second film forming resin solution on the outer peripheral surface or the inner peripheral surface of the first coat film, to cover the outer the outer peripheral surface or the inner peripheral surface of the first coat film, and the outer peripheral surface or the inner peripheral surface of at least the end in the width direction of the second band-shaped member that is closer to the center of the core, and to form a coating of the second film forming resin solution;

drying the coating of the second film forming resin solution to form a second coat film;

peeling off the first band-shaped member and the second band-shaped member from the core; and removing the first coat film and the second coat film from the core after the peeling off of the first band-shaped member and the second band-shaped member.

BRIEF DESCRIPTION OF THE DRAWINGS

Exemplary embodiments of the present invention will be described in detail based on the following figures, wherein.

DETAILED DESCRIPTION

Figure 1A:
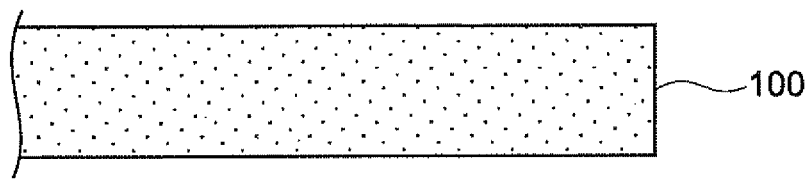
FIG. 1A to FIG. 1D are process flow diagrams showing a method for manufacturing an endless belt according to a first exemplary embodiment of the present invention.

Hereinafter, exemplary embodiments of the present invention will be described with reference to the drawings. In the drawings, identical or corresponding members have been assigned with the same reference symbol, and any descriptions that explain the subject matter redundantly will not be repeated.

FIGS. 1A to 3I are process flow diagrams showing a method for manufacturing an endless belt according to a first exemplary embodiment of the invention. FIG. 1A to FIG. 3I show partial cross-sectional views of the endless belt cut along the axial direction of the core (i.e., the longitudinal direction of the core). In FIGS. 1A to 3I, the edge of the core on the right hand side in the drawings is an end in the axial direction of the core.

In the method for manufacturing an endless belt 101 (tubular body) according to the exemplary embodiment, first, a core 100 is prepared as shown in FIG. 1A.

Examples of the core 100 include a cylindrical mold and the like. Examples of the material of the core 100 include a metal such as aluminum, stainless steel, or nickel. The length of the core 100 is required to be equal to or longer than the length of the intended endless belt, but it is preferable that the length be 10% to 40% longer than the length of the intended endless belt.

The two ends in the axial direction of the core 100 may be, for example, furnished with holding plates (not shown in the figures). In regard to the furnishing, methods like welding or screw cramping may be used, but welding is preferred. There are available various welding methods, including gas welding, arc welding, plasma welding, electrical resistance welding, tungsten inert gas (TIG) welding, metal inert gas (MIG) welding, metal active gas (MAG) welding, and the like, but the welding method is selected depending on the type of metal to be used.

In regard to the surface roughness of the core 100, when the resin coat film is to be formed of a polyimide resin, for example, it is desirable that the core surface is roughened at a Ra value of 0.2 μm to 2 μm. Examples of surface roughening methods include blasting, cutting, and sandpaper rubbing.

Figure 1B:
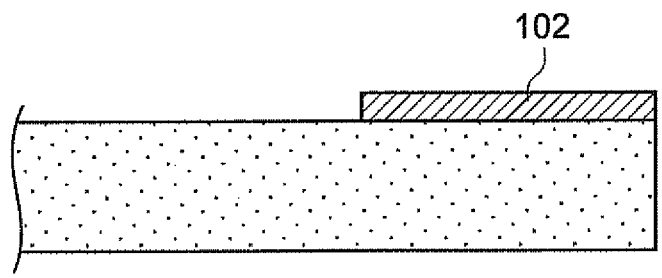
Figure 4:
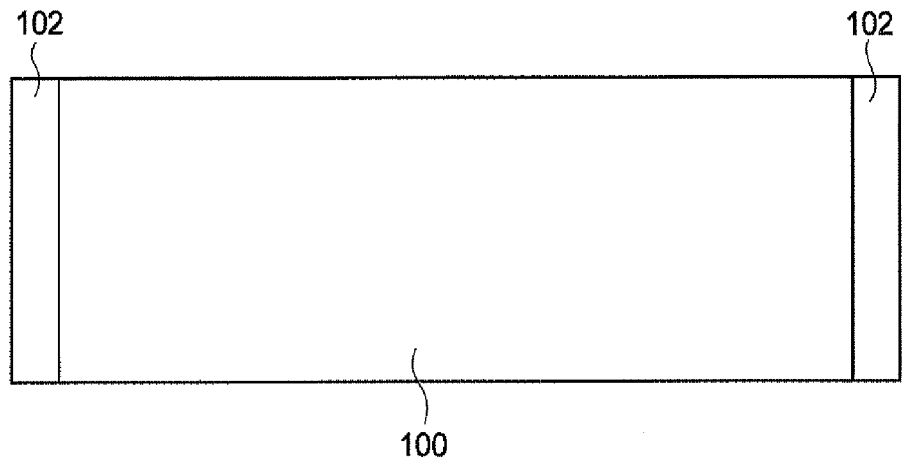
FIG. 4 is a side view showing the configuration of a first masking member attached to a core in the method for manufacturing an endless belt according to the first exemplary embodiment of the invention.
Figure 5:
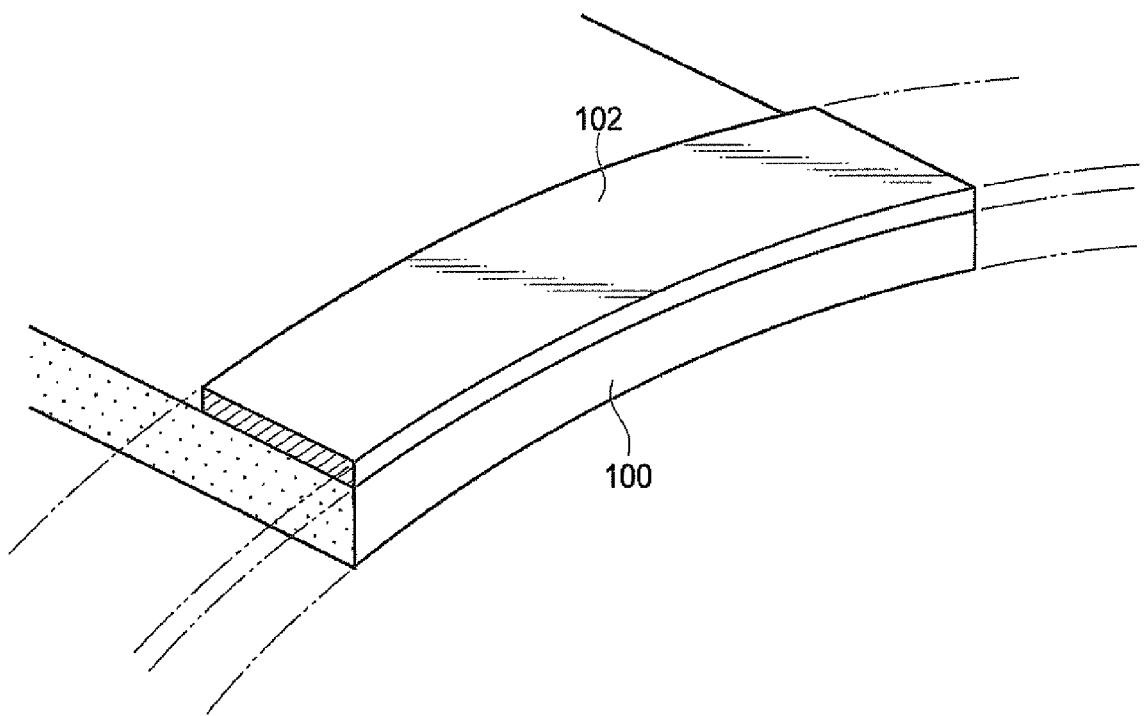
FIG. 5 is a partial perspective view showing the configuration of a first masking member attached to a core in the method for manufacturing an endless belt according to the first exemplary embodiment of the invention.

Subsequently, as shown in FIG. 1B, the outer peripheral surface of at least one end in the axial direction of the core 100 is attached with a first masking member 102 (first band-shaped member) along the circumferential direction of the outer peripheral surface (see also FIG. 4 and FIG. 5). According to the exemplary embodiment, the first masking member 102 is attached to the outer peripheral surface of each of the two ends in the axial direction of the core 100.

Figure 15:
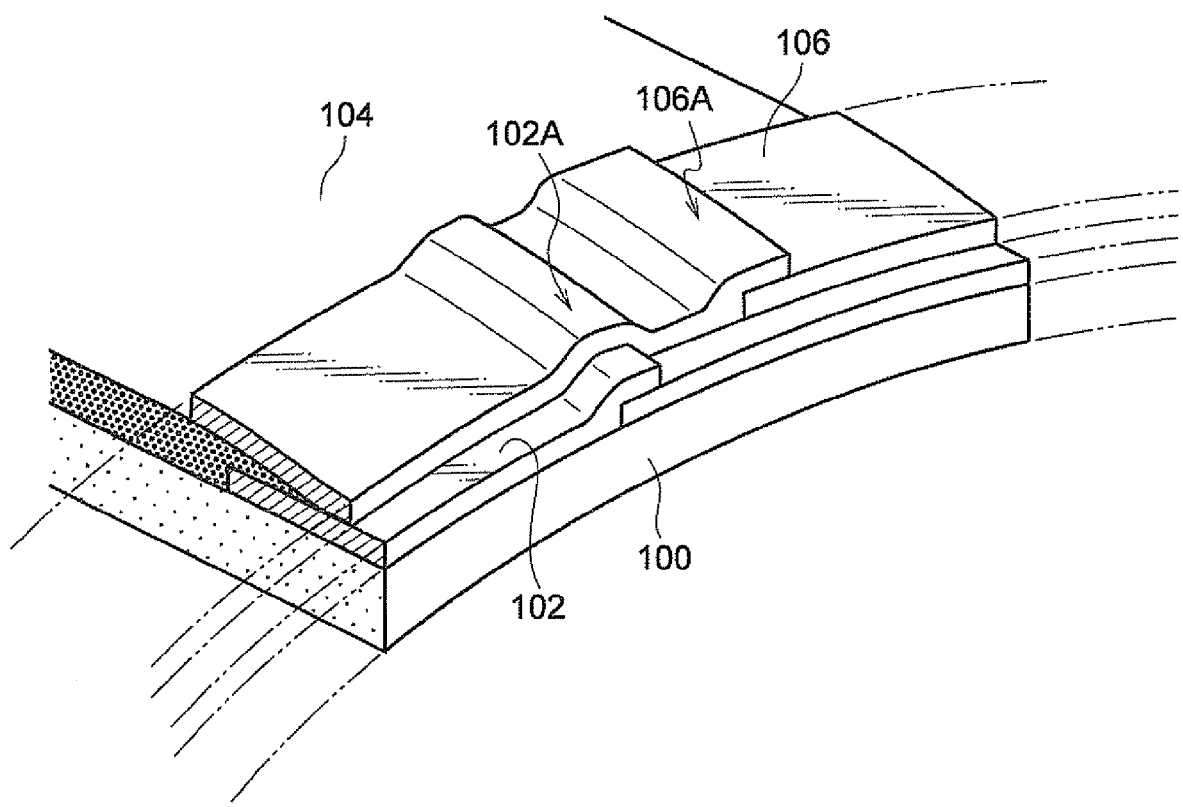
FIG. 15 is a partial perspective view for explaining the positional relationship of the superposition section of a first masking member and the superposition section of a second masking member, in the method for manufacturing an endless belt according to an exemplary embodiment of the invention.

The first masking member 102 is, for example, wound once around the outer peripheral surface of each of the two ends in the axial direction of the core 100, along the circumferential direction of the core 100, and one end in the direction of winding (the end where the attachment is finished) is superimposed with the other end (the end where the attachment is started), so that a superposition section 102A (in which the one end of the first masking member 102 is superimposed over another end thereof) is provided (see also FIG. 15).

Here, the first masking member 102 may be attached such that the end surface thereof in the width direction that is closer to the external side (closer to the end) of the core 100 may substantially form part of the same surface as the end surface in the axial direction of the core 100; or may be attached such that the end in the width direction of the first masking member that is closer to the external side (closer to the end) of the core 100 protrudes outwardly from the core 100 relative to the end in the axial direction of the core 100; or may be attached such that the end in the width direction of the first masking member that is closer to the external side of the core 100 is closer to the center of the core 100 than the end in the axial direction of the core 100.

The first masking member 102 preferably has a width of, for example, 5 mm to 20 mm.

An example of the first masking member 102 includes an adhesive tape formed by coating a resin film (such as a polyester resin film or a polypropylene resin film) or a paper material (such as crepe paper or smooth paper) with an adhesive material (for example, an acrylic adhesive material). Particularly, an adhesive tape coated with an acrylic adhesive material is preferable as the first masking member 102, and such a tape which has been treated to have no adhesive material remaining on the surface of the core 100 when the masking member is taken off, is suitable. Specifically, for example, an adhesive tape having a property that the adhesiveness of the adhesive material decreases with an increase in temperature, is preferable as the first masking member 102.

Figure 1C:
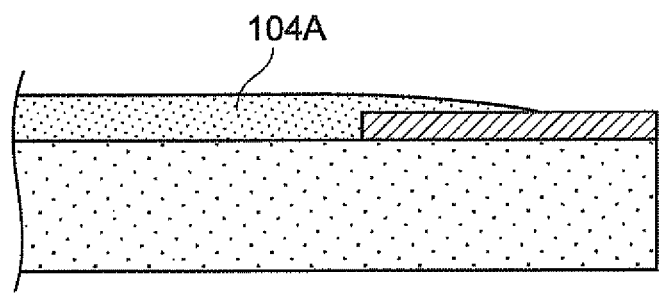

Subsequently, as shown in FIG. 1C, a first film forming resin solution is applied on the outer peripheral surface of the core 100 to form a coating 104A of the first film forming resin solution. This coating 104A of the first film forming resin solution is formed to cover the outer peripheral surface of the core 100 and at least the outer peripheral surface at the end in the width direction of the first masking member 102 that is closer to the center of the core 100. Specifically, for example, the coating 104A of the first film forming resin solution is formed over the entire surface of the outer peripheral surface of the core 100 except for the area attached with the first masking member, and at the same time, is formed to cover the outer peripheral surface at the end in the width direction of the first masking member 102 that is closer to the center of the core 100. This coating 104A of the first film forming resin solution is desirably formed in such a manner that the outer peripheral surface at the end in the width direction of the first masking member 102 that is closer to the external side of the core 100 is exposed or is not covered by the coating 104A.

Here, the method of applying the film forming resin solution may be a coating method that is capable of arbitrarily adjusting the coating width. As for the coating method, a "die type coating method" or a "spiral coating method" of applying the film forming resin solution on the outer peripheral surface of the core 100 while rotating the core 100 around its axis that is placed horizontally may be mentioned, and the "spiral coating method" is particularly preferable.

Figure 8:
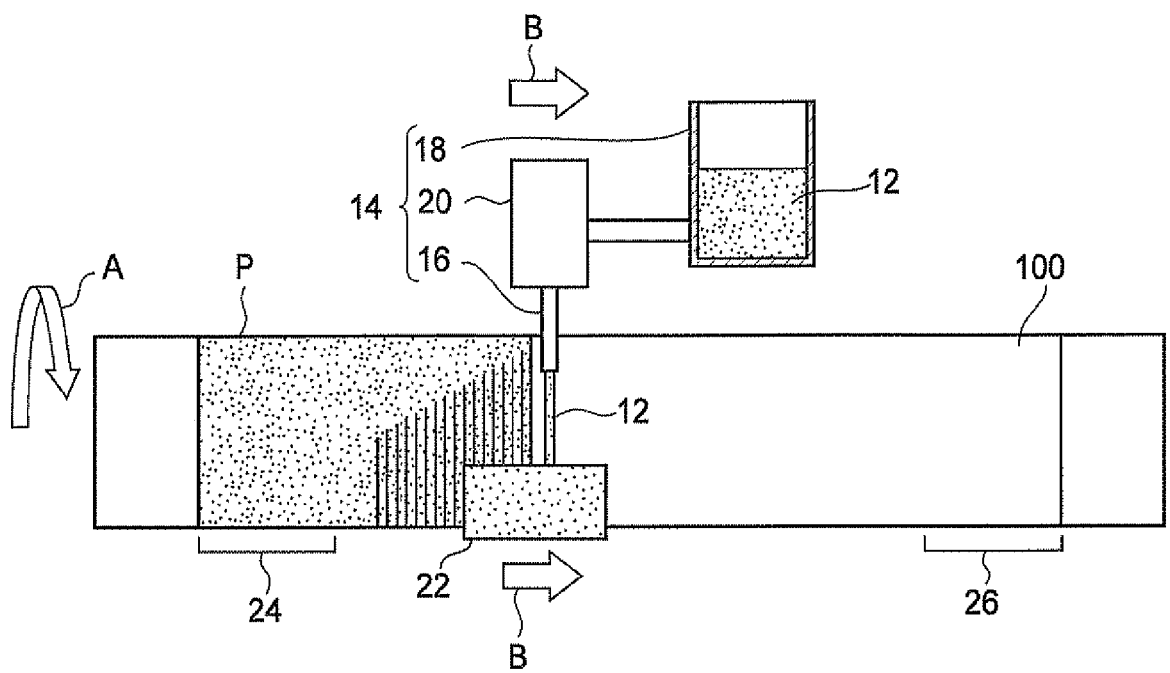
FIG. 8 is a schematic block diagram showing an example of a coating apparatus used in the method for manufacturing an endless belt according to an exemplary embodiment of the invention.

The coating apparatus used in the spiral coating method is, as shown in FIG. 8, a coating apparatus that applies the film forming resin solution 12 on the core 100 to form a coating P thereon. Here, although not shown in the figures, the core 100 is placed on a pedestal having an arm that supports the core to rotate on a horizontal axis (arrow A), with the aid of a holding member. Furthermore, although not shown in the figures, the core 100 is connected to a driving unit (rotating unit) that rotates the core 100 in an axial direction of the core 100, via the holding member.

Also disposed around the core 100 is a downflow apparatus 14 (adhering unit) that adheres the film forming resin solution 12 to the core 100 by flowing down the film forming resin solution 12.

The downflow apparatus 14 (dispenser) includes, for example, a nozzle 16 that flows down the film forming resin solution 12, and a container 18 that supplies the film forming resin solution 12 to the nozzle 16. The container 18 may have a meniscus cylinder, a screw or the like. The downflow apparatus 14 may be in the form in which the nozzle 16 and the container 18 are connected by a connection tube so that the nozzle 16 and the container 18 are separately disposed, or may be in the form in which the nozzle 16 and the container 18 are integrally constructed. In the exemplary embodiment, a downflow apparatus in which the container 18 and the nozzle 16 are separately provided and connected via a pump 20, will be explained. The amount of downflow may be controlled using, for example, an electronic valve interposed between the nozzle 16 and the container 18.

Since the film forming resin solution 12 such as a polyimide resin solution usually has high viscosity, for example, as high as 1 MPa·s or more, and does not naturally flow down, it is desirable to allow the resin solution to flow down using the pump 20. The pump 20 may be preferably, for example, NEMO Pump (registered trade name, manufactured by HEISHIN Ltd.).

The distance between the nozzle 16 and the core 100 is preferably, for example, from 10 mm to 100 mm.

Around the core 100, for example, a blade 22 is provided which serves as a smoothing unit that smoothes the film forming resin solution 12 that has adhered to the core 100. The blade 22 is located over the core 100 in such a manner that the tip thereof substantially contacts the core 100, such that the film forming resin solution 12 that has adhered to the core 100 is smoothened by the blade 22. The blade 22 is, for example, made to contact with the core 100 such that the tip of the blade bends.

Here, it is desirable that the pressing force at which the blade 22 contacts the core 100 may be set, for example, in accordance with the maximum amount of fluctuation upon rotation of a core 100 having a degree of circularity of 0 mm to 1 mm (for example, a maximum amount of fluctuation of 0 to 2 mm), that is, the pressing force may be set to be in the range of 0.2 N to 4 N so that the blade 22 may make appropriate contact with the core 100 according to the amount of fluctuation, and thereby a spiral shape is not generated in the coating.

The downflow apparatus 14 (nozzle 16) and the blade 22 are moved relatively in a horizontal direction (arrow B) from one end to the other end of the core 100 during rotation of the core 100 so that the regions at which the film forming resin solution 12 is to be adhered and smoothened (hereinafter, may be referred to as "adhesion region" and "smoothening region") are moved from one end to the other end of the core 100, whereby the film forming resin solution 12 is adhered to the core 100 and is smoothened. Although not shown in the figures, the adhesion and smoothening may also be performed by a known technique in which the downflow apparatus 14 (nozzle 16) and the blade 22 are moved, or in which the core 100 is moved.

When the downflow apparatus 14 (nozzle 16) and the blade 22 are interlocked and moved in a horizontal direction from one end to the other end of the core 100, the film forming resin solution 12 is applied on the outer peripheral surface of the core 100. The speed of this movement may be considered as the coating speed.

The conditions for coating may be such that, for example, the rate of rotation of the core 100 is from 20 rpm to 200 rpm, and the coating speed V is from 0.1 m/min to 2.0 m/min.

In the coating apparatus having the present configuration, first, the film forming resin solution 12 is made to flow down from the nozzle 16 of the downflow apparatus 14 while the core 100 is rotated in the direction of the arrow A, thereby adhering the film forming resin solution 12 to the core 100. Immediately after the adhesion, the blade 22, which is located at a contact position 24 on the side of one end of the core 100, is then moved in the horizontal direction, thereby smoothening the film forming resin solution 12 that has adhered to the core 100. Then, the adhesion region and the smoothing region (regions in which the downflow apparatus 14 and blade 22 are located, respectively) are moved in the horizontal direction (arrow B) from one end to the other end of the core 100 in accordance with every rotation of the core 100.

Thereafter, immediately before the application of the film forming resin solution 12 to the core 100 is finished, the blade 22 is moved in the horizontal direction to the retraction position 26 on the side of the other end of the core 100, and is retracted from the core 100.

In this manner, the film forming resin solution 12 is applied on the outer peripheral surface of the core 100, whereby a coat film is formed, and the process of application is finished.

Figure 1D:
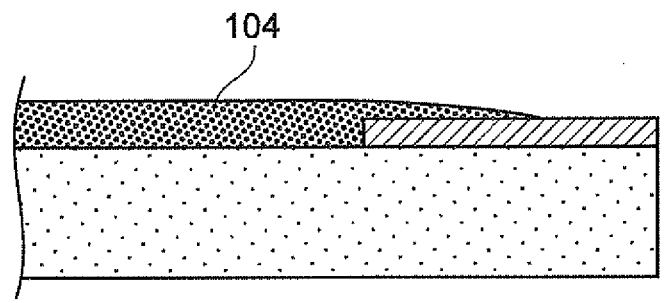

Subsequently, as shown in FIG. 1D, the coating 104A of the first film forming resin solution is dried to form a first coat film 104. The coating 104A of the first film forming resin solution may be dried by, for example, heating the core 100. The heating conditions are preferably, for example, at a temperature of 80° C. to 200° C. for 10 minutes to 60 minutes, and as the temperature is increased, the heating time is preferably shortened. At the time of heating, it is also effective to blowing hot air. During the heating, the temperature may be increased stepwise, or may be increased without changing the rate. It is preferable to lay the axial direction of the core 100 horizontally, and to rotate the core 100 slowly at a rate of 5 rpm to 60 rpm. After drying the coating, the core 100 may be positioned vertically.

Figure 2E:
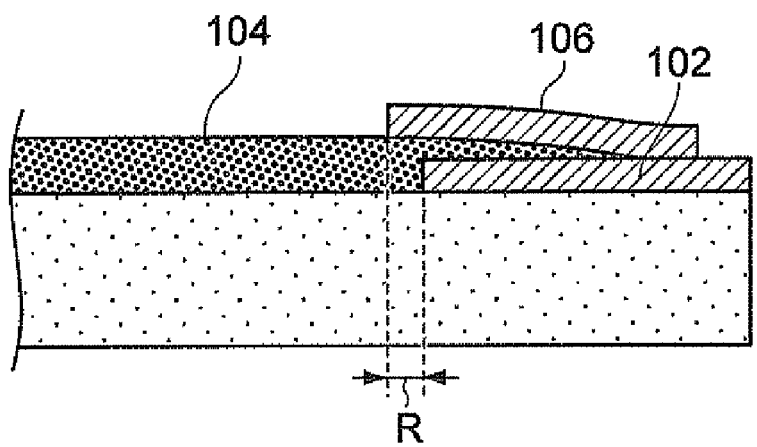
FIG. 2E to FIG. 2G are process flow diagrams showing the method for manufacturing an endless belt according to the first exemplary embodiment of the present invention.
Figure 6:
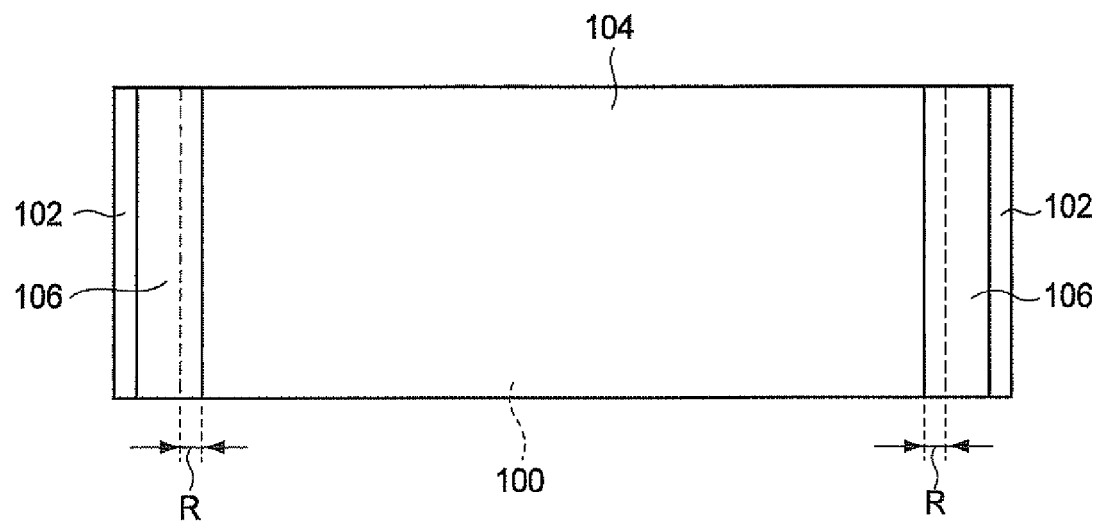
FIG. 6 is a side view showing the configuration of a second masking member attached to a core in the method for manufacturing an endless belt according to the first exemplary embodiment of the invention.
Figure 7:
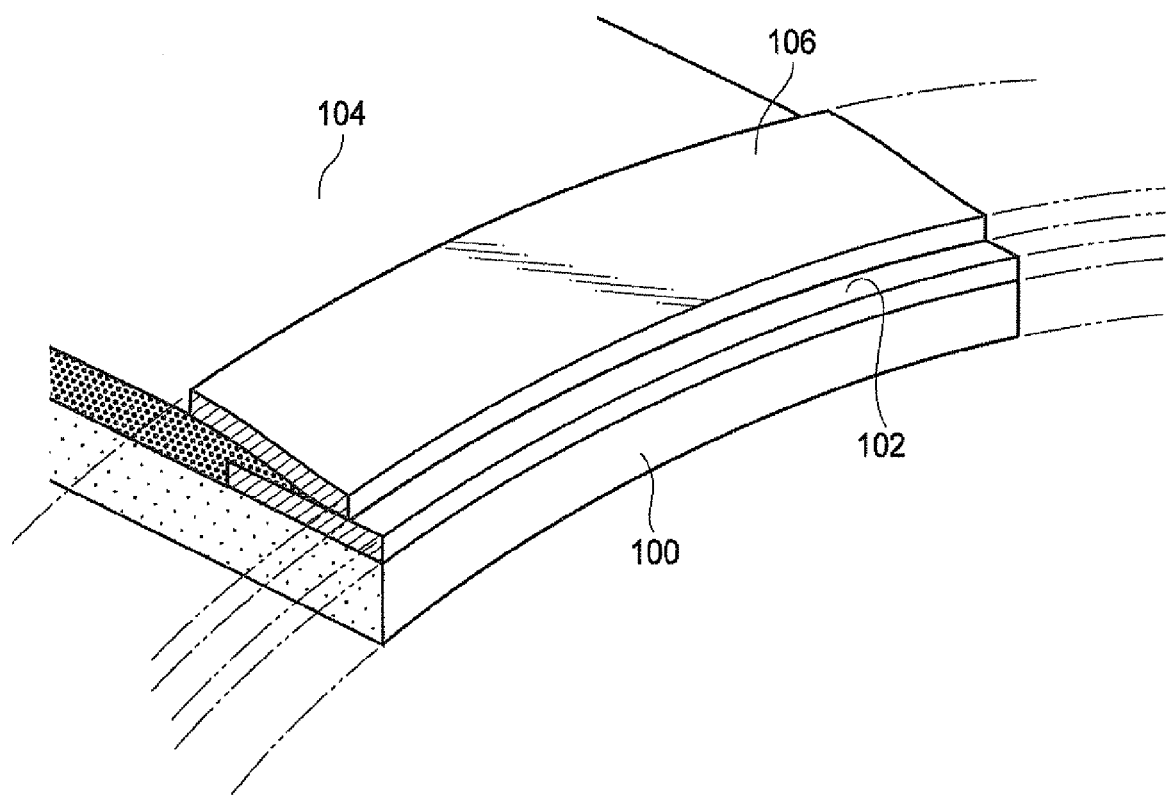
FIG. 7 is a partial perspective view showing the configuration of a second masking member attached to a core in the method for manufacturing an endless belt according to the first exemplary embodiment of the invention.

Subsequently, as shown in FIG. 2E, a second masking member 106 is attached to the outer peripheral surface at the end of the first coat film 104 on the side where the first masking member 102 has been attached, along the circumferential direction of the outer peripheral surface (see also FIG. 6 and FIG. 7). A part of the second masking member 106 may be attached also on the first masking member 102 that is exposed without having the first coat film 104 being applied thereon.

The second masking member 106 is, for example, wound once around the relevant outer peripheral surface along the circumferential direction, and one end in the direction of winding (the end where the attachment is finished) of the second masking member 106 is superimposed on the other end (the end where the attachment is started) thereof, so that a superposition section 106A (in which the one end of the second masking member 106 is superimposed over another end thereof) is provided (see FIG. 15). From the viewpoint of reliably removing the first masking member 102 and the second masking member 106 from the core 100, it is preferable that the other end of the second masking member 106 is located at the upstream side in the direction of winding with respect to the one end in the direction of winding of the first masking member 102. In other words, it is preferable that the superposition section 102A of the first masking member 102 and the superposition section 106A of the second masking member 106 are located so as not to overlap in the circumferential direction of the core 100 (see FIG. 15).

The attachment of the second masking member is carried out in such a manner that the end in the width direction of the second masking member 106 that is closer to the center of the core 100, is closer to the center of the core 100 than the end in the width direction of the first masking member 102 that is closer to the center of the core 100.

That is, the second masking member 106 is attached such that the end in the width direction of the second masking member 106 that is closer to the center of the core 100 protrudes, toward the center of the core 100, from the end in the width direction of the first masking member 102 that is closer to the center of the core 100. In other words, the second masking member 106 is attached such that the second masking member 106 covers the upper part of the end in the width direction of the first masking member 102 that is closer to the center of the core 100 (more specifically, for example, covers the part upper to the boundary between the end surface in the width direction of the first masking member 102 that is closer to the center of the core 100, and the first coat film 104).

In order to dispose the end in the width direction of the second masking member 106 that is closer to the center of the core 100, to be closer to the center of the core 100 than the end in the width direction of the first masking member 102 that is closer to the center of the core 100, for example, there is adopted a method of attaching a second masking member 106 having a width that is substantially equal to the width of the first masking member 102, to be shifted closer to the center in the axial direction of the core 100 than the area of attachment of the first masking member 102; or a method of attaching and superimposing a second masking member 106 having a width that is larger than the width of the first masking member 102 on the first masking member 102, in such a manner that the end in the width direction of the second masking member 106 that is closer to the external side of the core 100 overlaps with the end in the width direction of the first masking member 102 that is closer to the externals side of the core 100.

The distance R in the axial direction of the core, between the end in the width direction of the second masking member 106 that is closer to the center of the core 100 and the end in the width direction of the first masking member 102 that is closer to the center of the core 100, may be from equal to or about 1 mm to equal to or about 5 mm.

The configuration of the second masking member 106 may be the same as that of the first masking member 102. A member that is identical to the first masking member 102 may be employed for the second masking member 106, or a member that is different from the first masking member 102 may be employed.

Figure 2F:
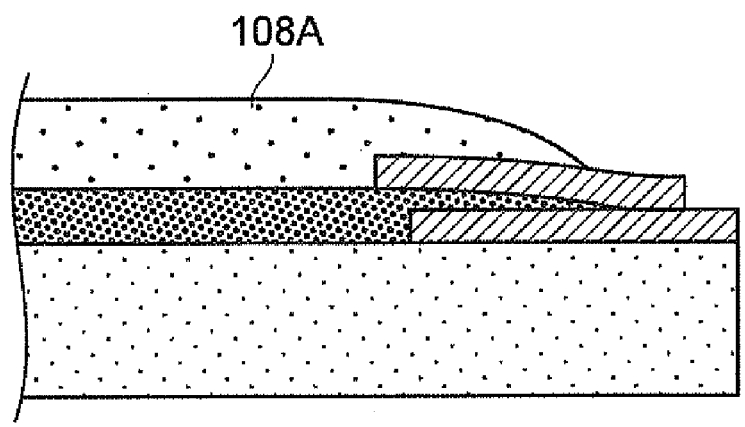

Subsequently, as shown in FIG. 2F, a second film forming resin solution is applied on the outer peripheral surface of the first coat film 104 to form a coating 108A of the second film forming resin solution. This coating 108A of the second film forming resin solution is formed to cover the outer peripheral surface of the first coat film 104 and at least the outer peripheral surface at the end in the width direction of the second masking member that is closer to the center of the core 100.

The coating 108A of the second film forming resin solution may be formed in such a manner that the outer peripheral surface at the end in the width direction of the second masking member 106 that is closer to the external side of the core 100 is exposed, or the entire outer peripheral surface of the second masking member 106 and a part of the outer peripheral surface of the first masking member 102 is covered with the coating 108A. However, it is desirable that, from the viewpoint of removing the first masking member 102 and the second masking member 106 from the core 100 without contaminating the core, the coating 108A of the second film forming resin solution is formed so that at least the outer peripheral surface at the end in the width direction of the first masking member 102 that is closer to the external side of the core 100 is exposed.

The second film forming resin solution may be identical to the first film forming resin solution, or may be different therefrom.

The method of applying the second film forming resin solution may be the same as the method of applying the first film forming resin solution. As a matter of fact, the application of the first film forming resin solution and the application of the second film forming resin solution may be carried out by adopting the same technique, or may be carried out by adopting different techniques.

Figure 2G:
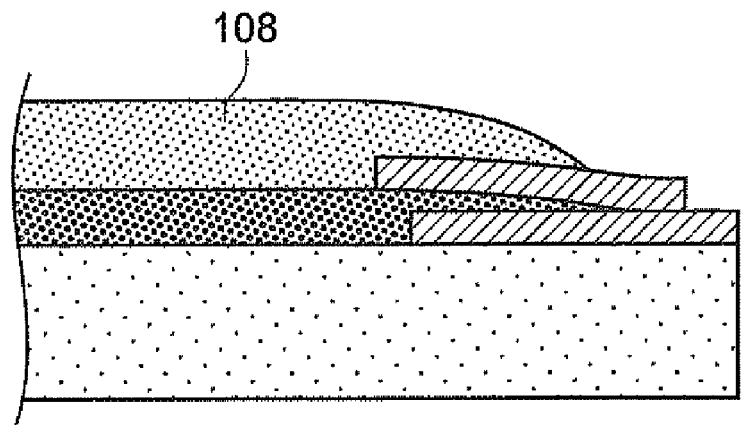

Subsequently, as shown in FIG. 2G, the coating 108A of the second film forming resin solution is dried to form a second coat film 108. The method of drying the coating 108A of the second film forming resin solution may be the same as that for the coating 104A of the first film forming resin solution. As a matter of fact, the drying of the coating 104A of the first film forming resin solution and the drying of the coating 108A of the second film forming resin solution may be carried out under the same conditions, or may be carried out under different conditions.

Figure 3H:
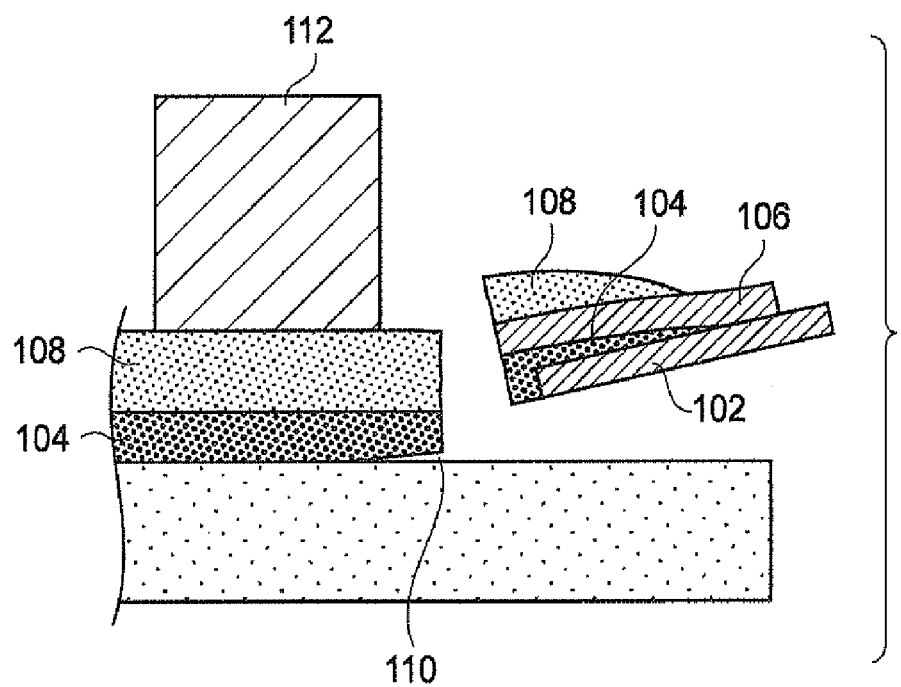
FIG. 3H to FIG. 3I are process flow diagrams showing the method for manufacturing an endless belt according to the first exemplary embodiment of the present invention.

Subsequently, as shown in FIG. 3H, the first masking member 102 and the second masking member 106 are taken off from the core 100. Specifically, the first masking member 102 is peeled off, together with the second masking member 106, from the core 100 along the circumferential direction by, for example, by pulling up the exposed end of the first masking member 102 in a radial direction of the core 100. At this time, the first coat film 104 covering the outer peripheral surface of the first masking member 102, and the second coat film 108 covering the outer peripheral surface of the second masking member 106, are also peeled off by the pulling. Owing to the force exerted on the first coat film 104 in the radial direction of the core 100, which is generated at the time of the peeling by pulling, a part of the first coat film 104 in the vicinity of the part of the first coat film 104 that is taken off by the pulling, is itself peeled off and rises up from the outer peripheral surface of the core 100. As a result, a gap 110 is generated between the end of the first coat film 104 (the first coat film remaining on the core 100) that is closer to the external side in the axial direction of the core 100, and the outer peripheral surface of the core 100. The length of the gap 110 in the axial direction of the core 100 may be from 1 mm to 10 mm.

The peeling of the first masking member 102 and the second masking member 106 from the core 100 may be carried out manually, or may be carried out using an instrument.

Here, when the first masking member 102 and the second masking member 106 are peeled off from the core 100, it is preferable to perform the peeling while pressing a pressing member 112 against the outer peripheral surface of the second coat film 108 at a position that is closer to the center of the core 100 than the end in the width direction of the second masking member 106 that is closer to the center of the core 100. For example, it is desirable to press the pressing member 112 on the outer peripheral surface of the second coat film 108 such that the distance between the end in the width direction of the pressing member 112 that is closer to the external side of the core 100 and the end in the width direction of the second masking member 106 that is closer to the center of the core 100, is from equal to or about 2 mm to equal to or about 10 mm.

By pressing the outer peripheral surface of the second coat film 108 with the pressing member 112, the portions of the first coat film 104 and the second coat film 108, which are closer to the center of the core 100 than the area pressed with the pressing member 112, may be prevented from tearing when the first masking member 102 and the second masking member 106 are peeled off. As a result, excessive tearing of the coat films (the first coat film 104 and the second coat film 108) upon the peel-off of the first masking member 102 and the second masking member 106 may be suppressed.

It is preferable to use, for example, a roll member (such as a rubber roll member, a resin roll member, or a metal roll member) as the pressing member 112. In this case, for example, a roll member as the pressing member 112 is positioned, while rotating the roll, at the position where the first masking member 102 and the second masking member 106 are peeled off from the core 100 (the position where portions of the first coat film 104 and the second coat film 108 are taken off), and the first masking member 102 and the second masking member 106 are peeled off from the core 100.

As a matter of fact, the pressing member 112 is not limited to a roll member, and for example, a frame member that presses the entire region in the circumferential direction of the second coat film 108 may also be employed.

Figure 3I:
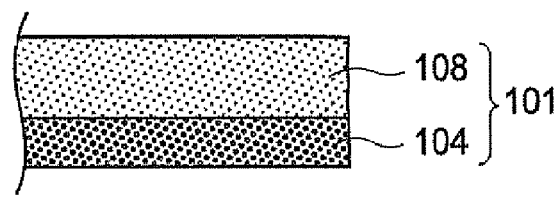

Subsequently, as shown in FIG. 3I, after peeling off the first masking member 102 and the second masking member 106, the first coat film 104 and the second coat film 108 are taken off from the core 100. In order to take off the first coat film 104 and second coat film 108 from the core 100, for example, a gas may be blown in through the gap generated between the end of the first coat film 104 that is closer to the external side in the axial direction of the core 100 and the outer peripheral surface of the core 100, to resolve the adherence between the entire inner peripheral surface of the first coat film 104 and the outer peripheral surface of the core 100, whereby the first coat film 104 and the second coat film 108 may be easily taken off from the core 100.

Through the above processes, an endless belt (tubular body), which has a layered structure including the first coat film 104 and the second coat film 108, is obtained. The thicknesses of the first coat film 104 (inner layer) and the second coat film 108 (outer layer) are independently set according to necessity, for example, in the range of 10 μm to 100 μm.

When a polyimide precursor solution is used as the first film forming resin solution and the second film forming resin solution, after a coating of the second film forming resin solution is formed and dried, and then the first masking member 102 and the second masking member are peeled off, the first coat film and the second coat film may be subjected to an imidation treatment (baking), and then the first coat film 104 and the second coat film 108 may be taken off from the core 100. In this way, an endless belt (tubular body) which has a layered structure including the first coat film 104 and the second coat film 108, is obtained.

In regard to the conditions for the imidation treatment (baking), the imidation reaction occurs, for example, when the coat films are heated at 250° C. to 450° C. (desirably, 300° C. to 350° C.) for 20 minutes to 60 minutes, whereby the coat films of polyimide resin are formed. During the reaction under heating, it is desirable that the temperature is raised stepwise or gradually at a constant rate, before the final temperature of heating is attained.

Since the obtained endless belt (tubular body) frequently has defects such as fluctuation in the thickness at the ends in the axial direction of the belt, the relevant end portions as unnecessary portions may be cut off. The obtained endless belt may also be subjected to punching processing, ribbing processing or the like, as necessary.

In the method for manufacturing an endless belt according to the first exemplary embodiment described above, the first masking member 102 (first band-shaped member) is attached to the outer peripheral surface of at least one of the two ends in the axial direction of the core 100, along the circumferential direction of the outer peripheral surface. Then, after forming the first coat film 104, the second masking member 106 (second band-shaped member) is attached to the region from the outer peripheral surface of the end of the first coat film 104 on the side where the first masking member 102 has been attached, to the exposed first masking member 102, along the circumferential direction of the outer peripheral surface. After the second coat film 108 has been formed, the first masking member 102 and the second masking member 106 are peeled off from the core 100.

Figure 12:
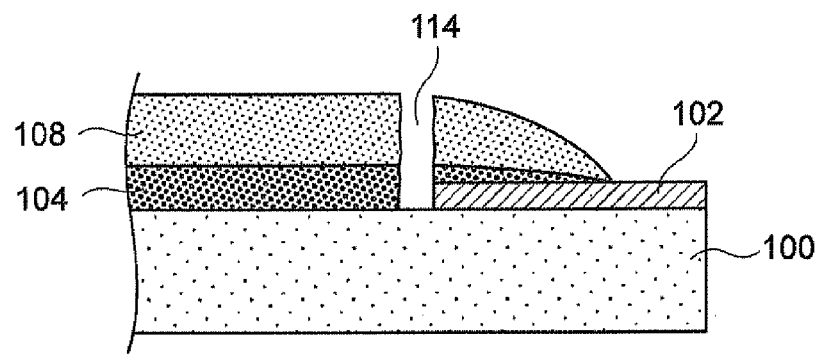
FIG. 12 is a partial cross-sectional view for explaining a method for manufacturing an endless belt as carried out in Comparative Example 2.

Meanwhile, in a case where only the first masking member 102 is used, when the first coat film 104 is formed, and then the second coat film 108 is formed by applying and forming a coating of the second film forming resin solution and drying the coating, a crack 114 may occur in a region of the first coat film 104 and the second coat film 108, which is located above a region at which the end (end surface) in the width direction of the first masking member 102 that is closer to the center of the core 100 contacts the first coat film 104 (see FIG. 12). The crack 114 may occur along the circumferential direction of the core 100.

Similarly, if the second masking member 106 is attached such that the end in the width direction thereof that is closer to the center of the core 100, is further to the external side of the core 100 than the end in the width direction of the first masking member 102 that is closer to the center of the core 100, then when the first coat film 104 is formed, and subsequently the second coat film 108 is formed by applying and forming a coating of the second film forming resin solution and drying the coating, a crack 114 may occur in a region of the first coat film 104 and the second coat film 108 located above a region at which the end (end surface) in the width direction of the first masking member 102 that is closer to the center of the core 100 contacts the first coat film 104 (see FIG. 13).

The crack 114 divides the first coat film 104 and second coat film 108 that have been formed on the outer peripheral surface of the first masking member 102 from the first coat film 104 and second coat film 108 that have been formed on the outer peripheral surface of the core 100. As a result, even when the first masking member 102 is peeled off, the gap between the end of the first coat film 104 that is closer to the external side in the axial direction of the core 100, and the outer peripheral surface of the core 100 may not be attained.

The reason for the occurrence of the crack 114 is not clearly known, but it is thought that: when the coating 108A of the second film forming resin solution is applied on the dried outer peripheral surface of the first coat film 104, the first coat film 104 swells; when the coating 108A of the second film forming resin solution is subsequently dried, there occurs a difference between the contraction due to the drying of the swollen first coat film 104 and the contraction due to the drying of the coating 108A of the second film forming resin solution.

Figure 14:
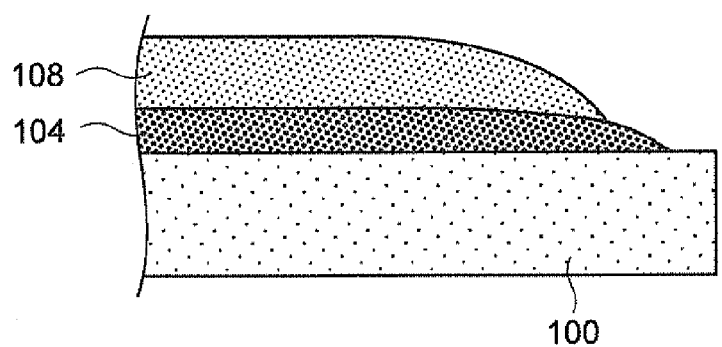
FIG. 14 is a partial cross-sectional view for explaining a method for manufacturing an endless belt as carried out in Comparative Example 1.

On the other hand, when the first coat film and the second coat film are formed without using the masking members, a gap is not generated between the end of the first coat film 104 that is closer to the external side in the axial direction of the core 100, and the outer peripheral surface of the core 100 (see FIG. 14).

Thus, in the method for manufacturing an endless belt according to the first exemplary embodiment of the invention, the attachment of the second masking member is carried out such that the end in the width direction of the second masking member 106 that is closer to the center of the core 100, is closer to the center of the core 100 than the end in the width direction of the first masking member 102 that is closer to the center of the core 100. Thereby, the part upper to the boundary between the end in the width direction of the first masking member 102 that is closer to the center of the core 100, and the first coat film 104, is covered by the second masking member 106 so that the second masking member 106 is interposed between the boundary and the coating 108A of the second film forming resin solution (second coat film 108), whereby the crack may not be generated.

Therefore, in the method for manufacturing an endless belt according to the exemplary embodiment of the invention, when the first masking member 102 and the second masking member 106 are peeled off from the core 100, a gap 110 is generated between the end of the first coat film 104 that is closer to the external side in the axial direction of the core 100 (the first coat film remaining on the core 100), and the outer peripheral surface of the core 100. Thus, the first coat film 104 and the second coat film 108 may be easily taken off from the core 100, utilizing the gap as the starting point of the peeling, without an excessive force.

Hereinafter, the film forming resin solution (including the first film forming resin solution and the second film fowling resin solution) that is applied in the method for manufacturing an endless belt according to the exemplary embodiment, will be explained.

The film forming resin solution contains at least a film forming resin and a solvent.

Suitable examples of the film forming resin include a polyimide resin (PI) and a polyamideimide resin (PAT). Other examples of the film forming resin include well known resins such as a polyamide resin, a polyether ether ester resin, a polyarylate resin, or a polyester resin.

In the case of using a polyimide resin as the film forming resin, the film forming resin solution may be a polyimide precursor solution containing a polyimide resin precursor. The polyimide precursor solution may be obtained by, for example, reacting a tetracarboxylic acid dianhydride with a diamine component in a solvent.

The components to be included in the polyimide precursor solution are not particularly limited, but a product which can be obtained by reacting an aromatic tetracarboxylic acid dianhydride with an aromatic diamine component is preferred.

Representative examples of the aromatic tetracarboxylic acid dianhydride include pyromellitic dianhydride, 3,3',4,4'-biphenyltetracarboxylic acid dianhydride, 3,3',4,4'-benzophenonetetracarboxylic acid dianhydride, 2,3,4,4'-biphenyltetracarboxylic acid dianhydride, 2,3,6,7-naphthalenetetracarboxylic acid dianhydride, 1,2,5,6-naphthalenetetracarboxylic acid dianhydride, 2,2-bis(3,4-dicarboxyphenyl)ether dianhydride, as well as tetracarboxylic acid esters thereof or mixtures of those various tetracarboxylic acid dianhydrides, and the like.

Representative examples of the aromatic diamine component include paraphenylenediamine, metaphenylenediamine, 4,4'-diaminodiphenyl ether, 4,4'-diaminophenylmethane, benzidine, 3,3'-dimethoxybenzidine, 4,4'-diaminodiphenylpropane, and 2,2-bis[4-(4-aminophenoxy)phenyl]propane.

Examples of the polyamideimide resin as the film forming resin include the products obtainable by subjecting an acid anhydride (such as trimellitic anhydride, ethylene glycol bisanhydrotrimellitate, propylene glycol bisanhydrotrimellitate, pyromellitic anhydride, benzophenonetetracarboxylic acid anhydride, or 3,3',4,4'-biphenyltetracarboxylic acid anhydride) and any of the above-mentioned diamines to a polycondensation reaction in equimolar amounts. Since the polyamideimide resin has an amide group, the resin easily dissolves in a solvent even when the imidation reaction proceeds; thus, 100% imidated products are preferred.

In regard to the solvent, well known solvents are used in accordance with the type of the film forming resin. For example, when a polyimide resin (PI) or a polyamideimide resin (PAI) is applied as the film forming resin, examples of the solvent that may be used include aprotic polar solvents such as N-methylpyrrolidone, N,N-dimethylacetamide and acetamide.

The solids concentration, viscosity and the like of the film forming resin solution are not particularly limited, but for example, the film forming resin solutions for the inner and outer layers may independently have a solids concentration of 10% by weight to 40% by weight, and a viscosity of 1 Pa·s to 100 Pa·s.

Here, the first film forming resin solution and the second film forming resin solution may be prepared using the same film forming resin, or may be prepared using different film forming resins, respectively.

The film forming resin solution may also include other additives such as electroconductive particles. That is, the film to be formed may contain other additives such as electroconductive particles. Examples of the material for the electroconductive particles include carbon materials (such as carbon black, carbon fiber, carbon nanotubes, or graphite), metals or alloys (such as copper, silver, aluminum or the like, or alloys thereof), electroconductive metal oxides (such as tin oxide, indium oxide, or antimony oxide), potassium titanate, barium sulfate, titanium oxide, and zinc oxide.

The concentration of the electroconductive particles may be, for example, 10 parts by weight to 40 parts by weight with respect to 100 parts by weight of the resin component.

Examples of the method of dispersing the electroconductive particles into the film forming resin solution include known methods using a ball mill, a sand mill (bead mill), a jet mill (counter collision type dispersing machine), or the like. A surfactant, a leveling agent or the like may also be added as a dispersion aid to the film forming resin solution.

The first film forming resin solution and the second film forming solution may be prepared to include the same concentration of the electroconductive particles, or may be prepared to include different concentrations thereof. That is, the first coat film and the second coat film may have the same surface resistivity, or may have different surface resistivities. When the first coat film and the second coat film are made to have different surface resistivities, it is preferable to adopt the method described in, for example, JP-A No. 2005-66838 for the adjustment of the surface resistivity.

In regard to the method for manufacturing an endless belt according to the exemplary embodiment, the embodiment of forming a first coat film 104 and a second coat film 108 on the outer peripheral surface of the core 100 is explained. However, the invention is not intended to be limited to this exemplary embodiment. For example, in a second exemplary embodiment of the invention, a cylindrical core 100 may be used as the core 100, and a first coat film 104 and a second coat film 108 may be formed on the inner peripheral surface of the cylindrical core 100. The conditions for the various processes in this case are equivalent to the conditions of the first exemplary embodiment.

Figure 9A:
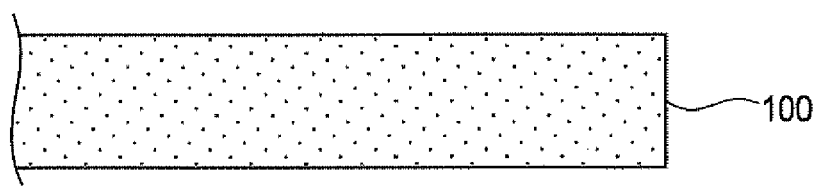
FIG. 9A to FIG. 9D are process flow diagrams showing a method for manufacturing an endless belt according to a second exemplary embodiment of the invention.

In this embodiment (i.e., in the method for manufacturing an endless belt according to the second exemplary embodiment of the invention), first, as shown in FIG. 9A, a cylindrical core 100 is prepared.

Figure 9B:
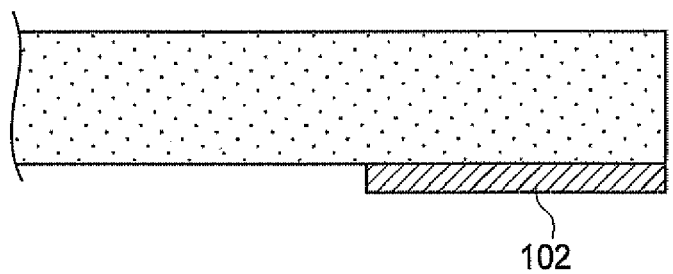

Subsequently, as shown in FIG. 9B, a first masking member (first band-shaped member) is attached to the inner peripheral surface of at least one end in the axial direction of the cylindrical core 100, along the circumferential direction of the inner peripheral surface.

Figure 9C:
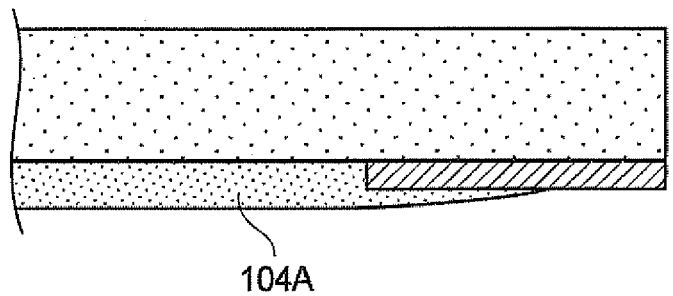

Then, as shown in FIG. 9C, a first film forming resin solution is applied on the inner peripheral surface of the core 100 to form a coating 104A of the first film forming resin solution. The first film forming resin solution is applied to cover the inner peripheral surface of the core 100 and at least the inner peripheral surface at the end in the width direction of the first masking member 102 that is closer to the center of the core 100.

Figure 9D:
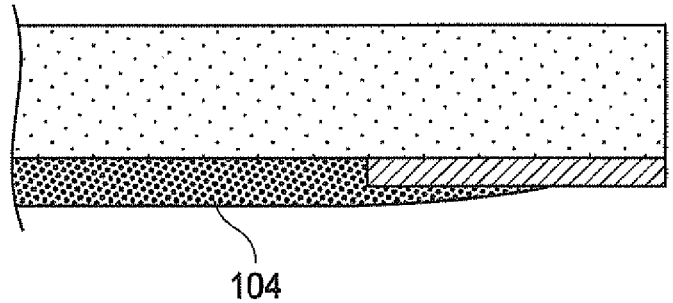

Subsequently, as shown in FIG. 9D, the coating 104A of the first film forming resin solution is dried to form a first coat film 104.

Figure 10E:
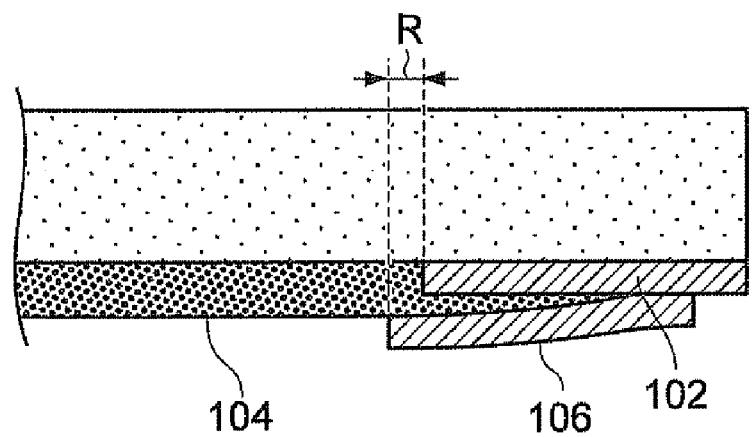
FIG. 10E to FIG. 10G are process flow diagrams showing a method for manufacturing an endless belt according to a second exemplary embodiment of the invention.

Then, as shown in FIG. 10E, a second masking member 106 (second band-shaped member) is attached to the inner peripheral surface at the end of the first coat film 104 on the side where the first masking member 102 has been attached, along the circumferential direction of the inner peripheral surface. The second masking member 106 is attached such that the end in the width direction of the second masking member 106 that is closer to the center of the core 100, is closer to the center of the core 100 than the end in the width direction of the first masking member 102 that is closer to the center of the core 100.

Figure 10F:
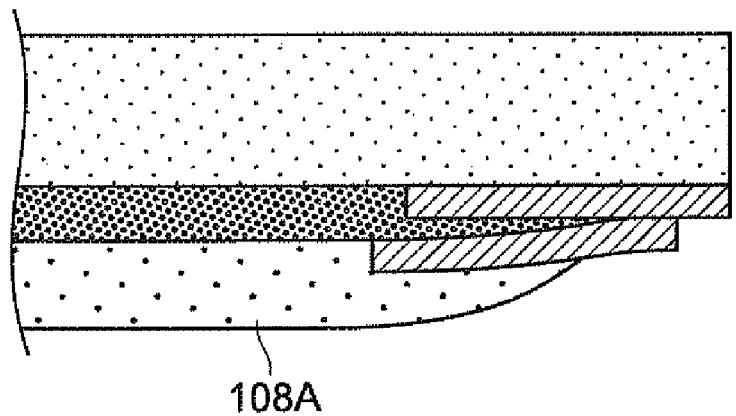

Subsequently, as shown in FIG. 10F, the second film forming resin solution is applied to the inner peripheral surface of the first coat film 104, to form a coating 108A of the second film forming resin solution. The coating 108A of the second film forming resin solution is applied to cover the inner peripheral surface of the first coat film 104 and the inner peripheral surface of at least the end in the width direction of the second masking member 106 that is closer to the center of the core 100.

Figure 10G:
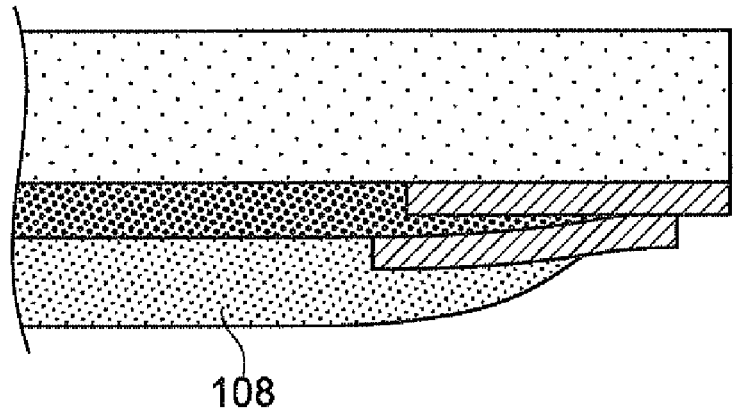

Then, as shown in FIG. 10G, the coating 108A of the second film forming resin solution is dried to form a second coat film 108.

Figure 11H:
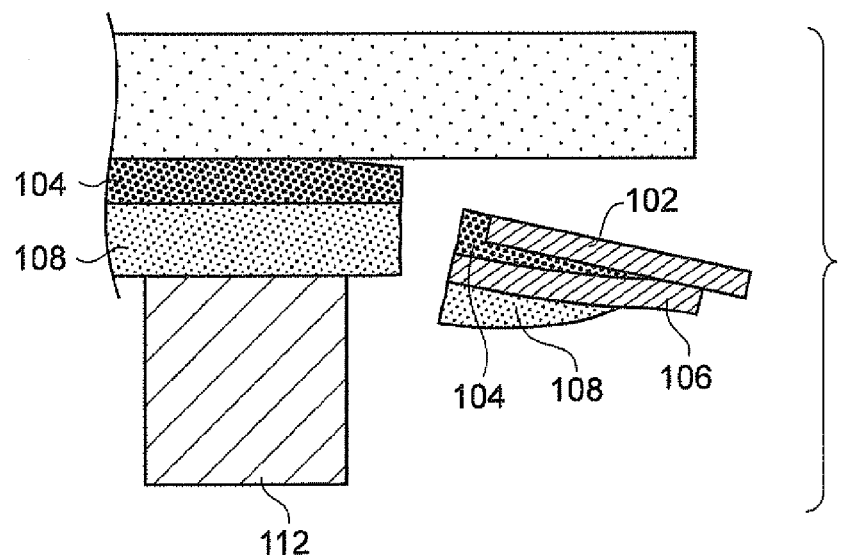
FIG. 11H to FIG. 11I are process flow diagrams showing a method for manufacturing an endless belt according to a second exemplary embodiment of the invention.

Subsequently, as shown in FIG. 11H, the first masking member 102 and the second masking member 106 are peeled off from the core 100.

Figure 11I:
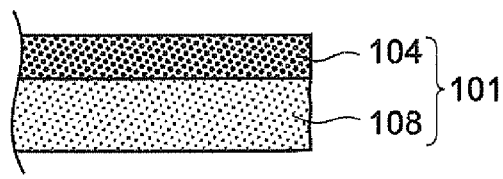

Then, as shown in FIG. 11I, after the peeling of the first masking member 102 and the second masking member 106, the first coat film 104 and the second coat film 108 are taken off from the core.

Through the processes described above, an endless belt (tubular body) that has a layered structure including the first coat film 104 and the second coat film 108, may be obtained. Other than these factors, the method is the substantially the same as the method for manufacturing an endless belt according to the first exemplary embodiment previously described.

Here, FIG. 9A to FIG. 11I are process flow diagrams showing the method for manufacturing an endless belt according to the second exemplary embodiment. In addition, FIG. 9A to FIG. 11I are process flow diagrams corresponding to the partial cross-sectional views cut along the axial direction of the core.

In the methods for manufacturing an endless belt according to the first and second exemplary embodiments of the invention, manufacture of endless belts having a bilayer structure including the first coat film 104 and the second coat film 108 has been described. However, the invention is not limited to these exemplary embodiments. For example, in another exemplary embodiment, an endless belt having a trilayer or multilayer structure may be formed by providing, for example, a third coat film in addition to the first coat film 104 and the second coat film 108. In the case of this exemplary embodiment, the same number of masking members (band-shaped members) as the number of the coatings that forms the coat films (film forming resin solutions) are used, and the masking members are attached in the same relationship as the first masking member 102 and the second masking member 106.

EXAMPLES

Hereinafter, the present invention will be more specifically described by way of Examples. However, these Examples are not intended to limit the invention.

Example 1

An endless belt is obtained according to the method for manufacturing an endless belt according to the first exemplary embodiment of the invention (see FIG. 1A to FIG. 7).

Formation of First Coat Film

First, 100 parts by weight of a PI precursor solution (trade name: U VARNISH, manufactured by Ube Industries, Ltd.; solids concentration: 18%, solvent: N-methylpyrrolidone) is mixed with 22% in terms of solids content by weight of carbon black (trade name: SPECIAL BLACK 4, manufactured by Degussa Huls AG), and 15 parts by weight of N-methylpyrrolidone, and then the mixture is dispersed with a counter collision type dispersing machine (trade name: GEANUS PY, manufactured by Geanus Co., Ltd.). Thus, a first film forming resin solution having a viscosity at 25° C. of about 12 Pa·s is obtained.

Subsequently, a cylinder made of stainless steel, SUS304, having an external diameter of 600 mm, a thickness of 8 mm and a length of 900 mm is prepared. A circular plate which has a thickness of 8 mm and an external diameter that fits into the cylinder, and is provided with four vent holes each having a diameter of 150 mm, is produced with the same SUS material, as a holding plate, and the holding plate is fitted in each of the both ends of the cylinder and welded thereto, thereby preparing a core (see FIG. 1A). The outer peripheral surface of the core is surface-roughened at a Ra of 0.4 μm by a blasting treatment using alumina particles.

Subsequently, the outer peripheral surface of the core is applied with a silicone releasing agent (trade name: SEPA-COAT, manufactured by Shin-Etsu Chemical Co., Ltd.), and is subjected to a baking treatment at 300° C. for one hour.

A first masking member (trade name: SCOTCH TAPE #232, manufactured by Sumitomo 3M, Ltd.; a product composed of a crepe paper substrate and an acrylic adhesive material, and having a width of 24 mm) is wound once around the outer peripheral surface at each of the two ends in the axial direction of the core, along the circumferential direction of the core. Each first masking member is attached in such a manner that one end in the direction of winding (the end where the attachment is finished) of the first masking member is superimposed with the other end (the end where the attachment is started) thereof (see FIG. 1B, FIG. 4 and FIG. 5).

Subsequently, the first film forming resin solution is applied on the outer peripheral surface of the core, to form a coating of the first film forming resin solution (FIG. 1C). This coating of the first film foaming resin solution is applied to cover the outer peripheral surface of the core and the outer peripheral surface at the end in the width direction of the first masking member that is closer to the center of the core.

A spiral coating method is used for the coating of the first film forming resin solution (see FIG. 8). The conditions for coating are such that a downflow apparatus is used in which a container containing 15 letters of the first film forming resin solution is connected to a monopump; the first film forming resin solution is ejected from the nozzle of the downflow apparatus at a rate of 20 ml per minute; and the core is rotated at a rate of 20 rpm. After the ejected first film forming resin solution is attached to the core, a blade is pressed at the surface and is moved in the axial direction of the core at a speed of 210 mm/min. The blade is a stainless steel plate having a thickness of 0.2 mm, a width of 20 mm, and a length of 50 mm. The width of coating is defined to be from a position at 10 mm from one end to a position at 10 mm from the other end in the axial direction of the core. After the coating, the core is maintained to further rotate for 5 minutes, whereby the spiral lines on the coating surface disappear.

In this manner, the coating of the first film forming resin solution having a thickness of 160 μm is formed. This thickness corresponds to a final thickness (i.e., the thickness after completion of imidation) of 33 μm.

Thereafter, the resultant is placed in a drying furnace at 180° C. while the core is rotated at a rate of 10 rpm, and the coating of the first film forming resin solution is dried for 20 minutes. Thus, the first coat film is formed (see FIG. 1D).

Subsequently, a second masking member (trade name: SCOTCH TAPE #232, manufactured by Sumitomo 3M, Ltd.;

a product composed of a crepe paper substrate and an acrylic adhesive material, and having a width of 24 mm) is wound once around the outer peripheral surface at each of the two ends of the first coat film in the axial direction of the core, along the circumferential direction of the core. Each second masking member is attached in such a manner that one end in the direction of winding thereof is superimposed with the other end thereof (see FIG. 2E, FIG. 6 and FIG. 7).

The attachment of this second masking member is carried out by locating the end in the width direction of the second masking member that is closer to the center of the core, to be closer to the center of the core than the end in the width direction of the first masking member that is closer to the center of the core. The distance (i.e., R shown in FIG. 2E) along the axial direction of the core between the end in the width direction of the second masking member that is closer to the center of the core and the end in the width direction of the first masking member that is closer to the center of the core, is adjusted to 2 mm. Moreover, the superposition section of the first masking member and the superposition section of the second masking member are adjusted not to overlap in the circumferential direction of the core.

Formation of Second Coat Film

First, 100 parts by weight of a PI precursor solution (the same as that used for the first film forming resin solution) is mixed with 18% in terms of solids content by weight of carbon black (trade name: SPECIAL BLACK 4, manufactured by Degussa Huls AG), and then the mixture is dispersed with a counter collision type dispersing machine (the same as that used for the first film forming resin solution). Thus, a second film forming resin solution having a viscosity at 25° C. of about 44 Pa·s is obtained.

Subsequently, the second film forming resin solution is applied on the outer peripheral surface of the first coat film, to form a coating of the second film forming resin solution (see FIG. 2F). The coating of the second film forming resin solution is applied to cover the outer peripheral surface of the first coat film and the outer peripheral surface at the end in the width direction of the second masking member that is closer to the center of the core.

The coating of the second film forming resin solution is carried out in substantially the same manner as in the coating of the first film forming resin solution, except that the amount of the second film forming resin solution ejected from the nozzle is set at 40 ml per minute. The width of coating is defined to be also from a position at 10 mm from one end to a position at 10 mm from the other end in the axial direction of the core. After the coating, the core is maintained to further rotate for 5 minutes, whereby the spiral lines on the coating surface disappear.

In this manner, the coating of the second film forming resin solution having a thickness of 300 μm is formed. This thickness corresponds to a final thickness (i.e., the thickness after completion of the manufacture of an endless belt) of 67 μm.

Thereafter, the resultant is placed in a drying furnace at 185° C. while the core is rotated at a rate of 10 rpm, and the coating of the second film forming resin solution is dried for 30 minutes. Thus, the second coat film is formed (see FIG. 2G).

In this state, the amount of residual solvent in the first coat film and the second coat film together is 40% by weight, and the coat films do not sag even when rotation of the core is stopped.

Subsequently, the first masking member is peeled off, together with the second masking member, from the core along the circumferential direction, by manually pulling up the exposed one end in the direction of winding of the first masking member in the radial direction of the core (see FIG. 3H). At this time, the first coat film covering the outer peripheral surface of the first masking member, and the second coat film covering the outer peripheral surface of the second masking member are also peeled off by the pulling. As a result, a gap is generated between the end of the first coat film (the first coat film remaining on the core) that is closer to the external side in the axial direction of the core, and the outer peripheral surface of the core. This gap is from 5 mm to 8 mm in width (length in the axial direction of the core).

When the first masking member and the second masking member are peeled off, the outer peripheral surface of the second coat film is pressed with the other hand, so that the coat film is not torn off.

Thereafter, the core is demounted from the rotating table, and is placed in a heating furnace in a vertical position. The core is heated at 200° C. for 30 minutes and at 300° C. for 30 minutes, thereby simultaneously carrying out the drying of the residual solvent and the imidation reaction of the first coat film and the second coat film.

Removal of First Coat Film and Second Coat Film

The first coat film and the second coat film are then cooled to room temperature (25° C.), and then a gas is blown in through the gap generated between the end of the first coat film that is closer to the external side in the axial direction of the core, and the outer peripheral surface of the core, whereby the adherence between the first coat film and the core is resolved. As a result, the first coat film and the second coat film is easily taken off from the core, without an excessive force (see FIG. 3I).

Through the processes described above, an endless belt formed from a layered structure of the first coat film and the second coat film is obtained. This endless belt is cut at the center in the width direction thereof, and unnecessary parts are also cut from both ends, thereby obtaining two endless belts having a width of 360 mm. When the thickness is measured with a dial gauge at five sites in the axial direction (width direction) and 10 sites in the circumferential direction, thus 50 sites in total, and the values are averaged, the total thickness of the first coat film and the second coat film is found to be 100 μm.

The electrical properties of the obtained endless belts are measured by the methods described below, and the surface resistivity is found to be 12.5 Log Ω/□, while the volume resistivity is found to be 13.8 Log Ω·cm. These electrical properties are measured as follows.

Surface Resistivity

The surface resistivity is a value obtained by dividing the slope of potential in a direction parallel to the current flowing along the surface of a specimen by the current per unit width of the surface, and is equal to the surface resistance between two electrodes which are two edges disposed opposite to each other in a square with each edge measuring 1 cm in length. The unit of the surface resistivity is formally Ω, but is expressed in Ω/□ so as to be distinguished from simple resistance.

The measurement is carried out using a digital ultra-high resistance/micro current meter (trade name: R8340A, manufactured by Advantest Corp.), a UR probe of double ring electrode (trade name: MCP-HTP12, manufactured by Dia Instruments Co., Ltd.), and a Resitable (trade name: UFL MCP-STO3, manufactured by Dia Instruments Co., Ltd.), according to a known testing method of thermosetting plastic (JIS K6911 (1995)), by applying a voltage to the ring electrode.

At the time of measurement, the specimen is placed on the Resitable, and the UR probe is hit against the specimen to be in contact with the surface to be measured, while a weight having a mass of 2.0±0.1 kg (19.6±1.0 N) is hung at the upper part of the UR probe so that the specimen is under a constant load. The duration of voltage application during the measurement is 10 seconds.

When the value read by the R8340A digital ultrahigh resistance/microcurrent meter is designated as R, and the surface resistivity correction coefficient of the UR probe MCP-HTP12 is designated as RCF(S), since RCF(S)=10.0 according to the "Resistivity Meter Series" catalogue of Dia Instruments Co., Ltd., the surface resistivity ρs is obtained by the following equation.

Equation: $\rho s (\Omega/\square) = R \times RCF(S) = R \times 10.0$

Volume Resistivity

The volume resistivity is a value obtained by dividing the current flowing over two sides of a specimen by the thickness of the specimen. This value is equal to the volume resistance between two electrodes which are two surfaces disposed opposite to each other in a cubic body with each edge measuring 1 cm in length.

The measuring apparatus used herein is the same as that used in the measurement of surface resistivity. The same load is hung, and the lower metal surface is used as a voltage applying electrode. The duration of voltage application during the measurement is 10 seconds.

When the thickness of the specimen is designated as t (μm), the value read by the digital ultrahigh resistance/microcurrent meter is designated as R, and the volume resistivity correction coefficient of the UR probe MCP-HTP12 is designated as RCF(V), since RCF(V)=2.011 according to the "Resistivity Meter Series" catalogue of Dia Instruments Co., Ltd., the volume resistivity ρv is obtained by the following equation.

Equation: $\rho v (\Omega \cdot cm) = R \times RCF(V) \times (10000/t) = R \times 2.011 \times (10000/t)$ Furthermore, according to the methods for measurement, the surface resistivity and volume resistivity are measured at 22° C. and 55% RH, at an applied voltage of 500 V. The measurement is taken at 4 sites in the axial direction of the endless belt, and 20 sites in the circumferential direction, thus 80 sites in total, and the average value thereof is taken.

Comparative Example 1

An endless belt is produced in the same manner as in Example 1, except that the first masking member and the second masking member used in Example 1 are not attached. In this case, after the drying of the coating of the second film forming solution, the end of the first coat film that is closer to the external side in the axial direction of the core is closely attached to the outer peripheral surface of the core, and thus a gap is not generated therebetween (see FIG. 14). Therefore, unless an excessive force is applied, the adherence between the first coat film and the core is not resolved, and the first coat film and the second coat film are not easily removed from the core.

Comparative Example 2

An endless belt is obtained in the same manner as in Example 1, except that the second masking member used in Example 1 is not attached. In this case, a crack is generated in the parts of the first coat film and the second coat film that are located upper to the boundary between the end (end surface) in the width direction of the first masking member that is closer to the center of the core, and the first coat film (see FIG. 12). Thus, even when the first masking member is peeled off, the end of the first coat film that is closer to the external side in the axial direction of the core remains closely attached to the outer peripheral surface of the core, and a gap is not generated. Therefore, unless an excessive force is applied, the adherence between the first coat film and the core is not resolved, and the first coat film and the second coat film are not easily removed from the core.

Comparative Example 3

An endless belt is obtained in the same manner as in Example 1, except that the end in the width direction of the second masking member used in Example 1 that is closer to the center of the core is attached at a position closer to the external side of the core than the end in the width direction of the first masking member that is closer to the center of the core. In addition, the distance along the axial direction of the core between the end in the width direction of the second masking member that is closer to the center of the core, and the end in the width direction of the first masking member that is closer to the center of the core, is adjusted to 1 mm.

Figure 13:
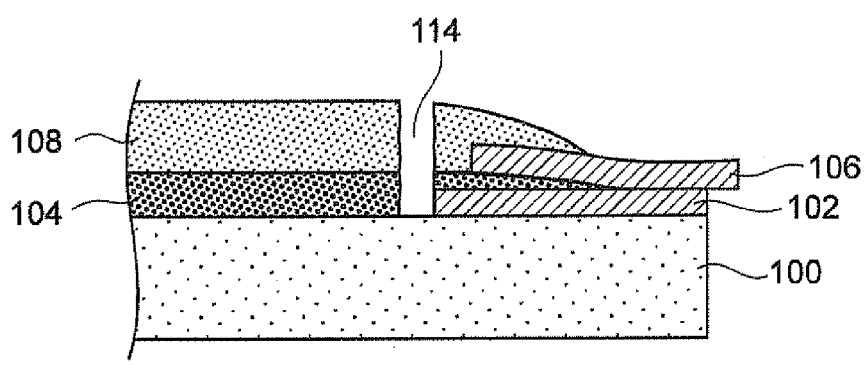
FIG. 13 is a partial cross-sectional view for explaining a method for manufacturing an endless belt as carried out in Comparative Example 3.

In this case as well, a crack is generated in the parts of the first coat film and the second coat film that are located upper to the boundary between the end (end surface) in the width direction of the first masking member that is closer to the center of the core, and the first coat film (see FIG. 13). Furthermore, even when the first masking member is peeled off, the end of the first coat film that is closer to the external side in the axial direction of the core remains closely attached to the outer peripheral surface of the core, and a gap is not generated. Therefore, unless an excessive force is applied, the adherence between the first coat film and the core is not resolved, and the first coat film and the second coat film are not easily removed from the core.

Example 2

An endless belt is obtained in the same manner as in Example 1, except that when the first masking member and the second masking member are peeled off as in Example 1, a pressing member is pressed with a force of 10 N against the outer peripheral surface of the second coat film that is closer to the core than against the end in the width direction of the second masking member that is closer to the center of the core. The characteristics of the obtained endless belt result in an average thickness and a resistance similar to those obtainable in Example 1.

The pressing is carried out by applying a urethane rubber roll having a diameter of 30 mm and a width of 20 mm as the pressing member, while rotating the roll. The pressing member is pressed against the outer peripheral surface of the second coat film, such that the distance between the end in the width direction of the pressing member that is closer to the external side of the core, and the end in the width direction of the second masking member that is closer to the center of the core is 5 mm.

In this case, when the first masking member and the second masking member are peeled off, a gap having a width (length in the axial direction of the core) of 5 mm is generated between the end of the first coat film (the first coat film remaining on the core) that is closer to the external side in the axial direction of the core, and the outer peripheral surface of the core. Moreover, even when the first masking member and the second masking member are peeled off vigorously, the finishing of the end surfaces are clean and neat as compared to Example 1; in addition, the possibility of excessive tearing off of the first coat film and the second coat film toward the center of the core is also reduced.

Example 3

The manufacturing process is carried out in the same manner as in Example 1 up to the step of attaching the second masking member, except that a polyester adhesive tape (trade name: No. 31B, manufactured by Nino Denko Corp.; width 21 mm) is used as the second masking member used in Example 1.

Subsequently, a second film forming resin solution is prepared using a polyamideimide resin (trade name: VYLOMAX 16NN, manufactured by Toyobo Co., Ltd.; solids concentration: 17% by weight, solvent: N-methylpyrrolidone), and using the same factors such as the mixing ratio of carbon black and the like as in Example 1. The viscosity of the solution is 20 Pa·s.

Then, a coating of a second film forming resin solution is formed in the same manner as in Example 1, except that the thus-prepared second film forming resin solution is used. After the coating is dried, the first masking member and the second masking member are peeled off by pulling, and subjected to a heating treatment to induce an imidation reaction of the first coat film, thereby obtaining an endless belt. As for the second coat film, a polyamideimide resin coat film is formed only by drying the solvent.

In regard to the characteristics of the obtained endless belt, the average thickness and resistance are substantially the same as those obtained in Example 1. Furthermore, the obtained endless belt is a belt having a bilayer configuration including a polyimide resin layer as the first coat film (inner layer) and a polyamideimide resin layer as the second coat film (outer layer). Although the polyamideimide resin is lower in the material cost than that of the polyimide resin, the mechanical strength thereof such as tensile modulus is poorer than the polyimide resin. However, since a polyamideimide resin is used for the first coat film (inner layer), the resultant belt does not suffer any disadvantageous factors due to the properties of the polyamideimide resin. Therefore, it is understood that the endless belt of Example 2 is an endless belt lower in cost than the endless belt of Example 1.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for manufacturing a tubular body, comprising:
    attaching a first band-shaped member to an outer peripheral surface or an inner peripheral surface of at least one end in an axial direction of a cylindrical core, along a circumferential direction of the outer peripheral surface or the inner peripheral surface;
    applying a first film forming resin solution on the outer peripheral surface or the inner peripheral surface of the core, to cover the outer peripheral surface or the inner peripheral surface of the core, and the outer peripheral surface or the inner peripheral surface of at least one end in the width direction of the first band-shaped member that is closer to the center of the core, and to form a coating of the first film forming resin solution;
    drying the coating of the first film forming resin solution to form a first coat film; attaching a second band-shaped member to the outer peripheral surface or inner peripheral surface of the end of the first coat film on the side where the first band-shaped member has been attached, such that the end in the width direction of the second band-shaped member that is closer to the center of the core, is closer to the center of the core than the end in the width direction of the first band-shaped member that is closer to the center of the core;
    applying a second film forming resin solution on the outer peripheral surface or the inner peripheral surface of the first coat film, to cover the outer peripheral surface or the inner peripheral surface of the first coat film, and the outer peripheral surface or the inner peripheral surface of at least the end in the width direction of the second band-shaped member that is closer to the center of the core, and to form a coating of the second film forming resin solution;
    drying the coating of the second film forming resin solution to form a second coat film;
    peeling off the first band-shaped member and the second band-shaped member from the core; and
    removing the first coat film and the second coat film from the core after the peeling off of the first band-shaped member and the second band-shaped member,
    wherein the first band-shaped member and the second band-shaped member are each attached so that respective superposition sections are formed in which one end in the direction of winding of the first band-shaped member is superimposed with the other end thereof, and one end in the direction of winding of the second band-shaped member is superimposed with the other end thereof, and
    the superposition section of the first band-shaped member and the superposition section of the second band-shaped member do not overlap in the circumferential direction of the core.

2. The method of manufacturing a tubular body of claim 1, wherein the second band-shaped member is attached such that the second band-shaped member covers a part upper to the boundary between the end in the width direction of the first band-shaped member that is closer to the center of the core, and the first coat film.

3. The method for manufacturing a tubular body of claim 1, wherein the coating of the second film forming resin solution is formed so that the outer peripheral surface or the inner peripheral surface of at least the end in the width direction of the first band-shaped member that is closer to the end of the core is exposed.

4. The method for manufacturing a tubular body of claim 1, wherein the coating of the first film forming resin solution is formed to expose the outer peripheral surface or the inner peripheral surface of at least the end in the width direction of the first band-shaped member that is closer to the end of the core.

5. The method for manufacturing a tubular body of claim 1, wherein a distance R in the axial direction of the core between the end in the width direction of the second band-shaped member that is located closer to the center of the core, and the end in the width direction of the first band-shaped member that is located closer to the center of the core, is from about 1 mm to about 5 mm.

6. The method for manufacturing a tubular body of claim 1, wherein when the first band-shaped member and the second band-shaped member are peeled off from the core, a pressing member is pressed against the outer peripheral surface of the second coat film that is closer to the center of the core, and is not pressed against the end in the width direction of the second band-shaped member that is closer to the center of the core.

7. The method for manufacturing a tubular body of claim 6, wherein a distance between the end in the width direction of the pressing member that is closer to the exterior of the core, and the end in the width direction of the second band-shaped member that is closer to the center of the core, is from about 2 mm to about 10 mm.

8. The method for manufacturing a tubular body of claim 6, wherein the pressing member is a roll member or a frame member.

* * * * *